June 25, 1946.   C. D. BOURCIER   2,402,597
EMERGENCY LANDING STRIP
Filed Dec. 19, 1944
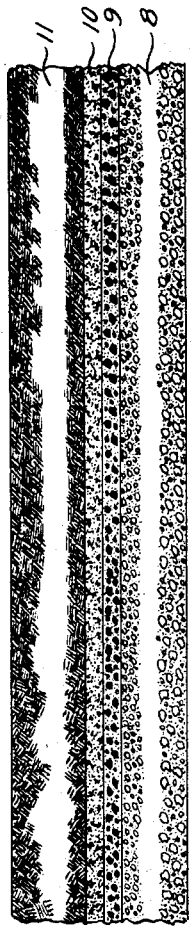
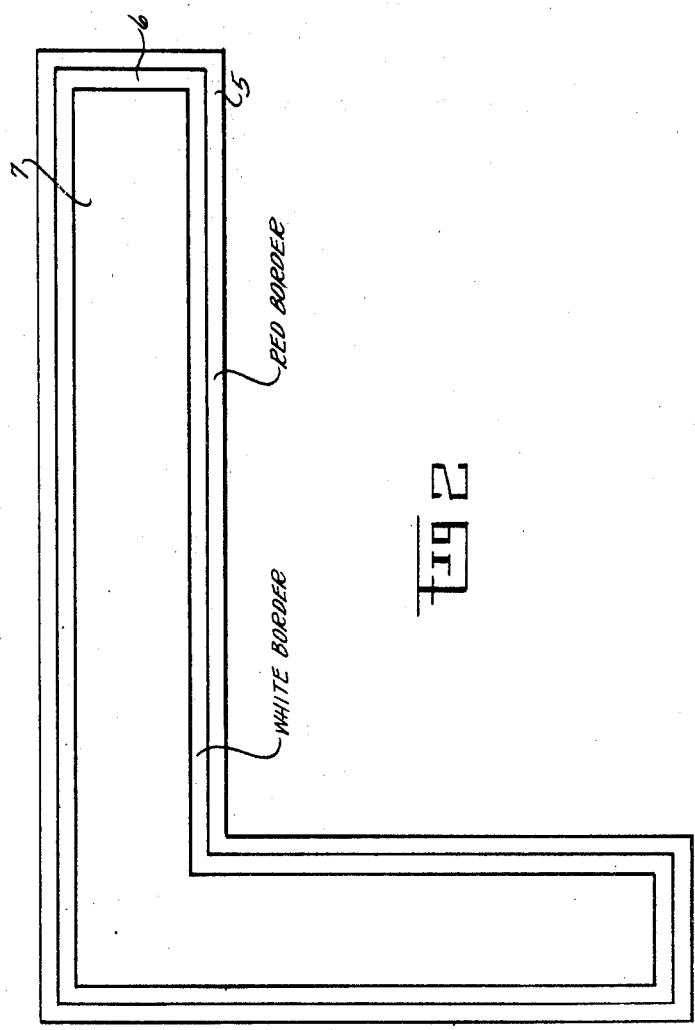
INVENTOR.
CHARLES D. BOURCIER
BY
ATTORNEYS Patented June 25, 1946

2,402,597

UNITED STATES PATENT OFFICE 2,402,597

EMERGENCY LANDING STRIP

Charles D. Bourcier, Grafton, Mass.

Application December 19, 1944, Serial No. 568,913
5 Claims. (Cl. 94—2)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to improvements in emergency or "belly landing" strips for aircraft. It is well known that a great many aircraft have been damaged or even destroyed when landing because the landing gear failed to function due to accidents or enemy action. The shock and stresses set up by contact of the fuselage of a rapidly moving airplane with a hard-surfaced runway are usually more than the airplane can withstand. The present invention, if put in use, will minimize damage to airplanes and injury or even death to personnel arising from belly or crash landings. This is the object of the invention.

In the accompanying drawing showing the preferred embodiment of the invention,

Fig. 1 is a vertical cross section through a landing strip; and

Fig. 2 is a plan view of the preferred arrangement of the landing strips.

Referring particularly to the drawing, the improved emergency landing strip consists of four superimposed layers of material laid in an excavation preferably at least 900 ft. long and 150 ft. wide, and extending in the direction of the prevailing wind. In localities where the prevailing wind is different at different seasons, two or more strips may be used, orientated to the direction of the seasonal winds. Whatever the number of the landing strips, it is highly desirable to mark them unmistakably, for instance, by red and white bands 5, 6 respectively bordering each strip 7. The bands 5, 6 may be appropriately lighted at night to warn aircraft of the nature of the landing strip.

Each landing strip consists of a gravel or crushed rock base 8 preferably about ten inches deep and laid in the bottom of the excavation, a Portland cement layer 9 about three inches deep covering the gravel base, a "Tarvia" or bituminous mix or asphalt layer 10 capable of being compacted by rolling and also about three inches deep, covering the cement layer, and on top, a layer 11 of loam impregnated with heavy oil, about ten inches deep. The gravel base will be compacted as much as possible by rolling or other methods, while the coating layers 9, 10 will be fairly dense because of their nature. Instead of cement, a layer of hard tar may cover the gravel base. In conjunction with the "Tarvia" coating 10, layer 9 will seal the gravel base and prevent surface water from working its way down into the gravel base and then freezing, with consequent damage to the landing strip, and will also prevent loss of oil by capillary action which may tend to cause seepage of the oil downwardly from the top layer 11. The top layer 11 will be left relatively loose, and only such packing will be resorted to as may be necessary to minimize water erosion. Sufficient oil or the like will be added to prevent winds from blowing dust from the loam. If preferred, sawdust and/or wood shavings up to fifty per cent by volume may be mixed with the loam prior to treatment with the oil. The top layer will provide a cushion which will permit a landing aircraft to slide and slither over the landing strip without tending to nose over. The proper depth and surface for the top cushion layer may be maintained readily by known types of earth-working and road-building machinery. Usually the loam used for the top cushion layer will be obtained by the excavation made for the landing strip. If the available loam contains gravel or rocks, these will be removed by screening before applying the oil.

I am aware that it has been proposed in Patent No. 2,171,153 to J. B. Warden dated August 29, 1939, to make a pavement for roads, streets, flying fields etc., out of one to three layers of earthy or mineral material (50% loam and 50% limestone screenings) treated with asphalt present to the extent of 3–10% by weight of the earthy material. Also R. C. Stubbs in Patent No. 1,507,868 dated September 9, 1924, proposes to pave roads, etc., by using a "subgrade" consisting of earth treated with oil or other water repellant matter to obviate the absorption of water by capillary action. So far as I know, however, no one has suggested employing a heavy loose layer of oil treated loam in a landing strip to cause the aircraft to slide or slither rather than to nose over, when making a belly landing. Another advantage of the invention is that the danger of fire is greatly reduced, not only because the aircraft remains upright and largely undamaged, but also because the friction is greatly reduced due to the presence of the oil in the loam, so that sparks are not thrown about to ignite any fuel that may be spilled.

Obviously the invention may be useful not only at airdromes but also adjacent important highways where it may be highly advantageous to have emergency landing strips at intervals.

Having described the invention, what is claimed as new and is desired to be secured by Letters Patent is:

1. A landing strip for facilitating safe belly landings of aircraft comprising, in combination, a porous base of fragmentary hard material, a water-sealing coating on top of the porous base, said coating being of substantial thickness so as to sustain substantial loads; and a heavy layer of loosely packed, oil-treated loam on top of the water-sealing coating.

2. The invention according to claim 1, wherein the porous base is at least ten inches deep, the water-sealing coating comprises a bituminous mixture at least three inches deep, and the oil-treated loam is at least ten inches deep.

3. The invention according to claim 1, wherein the water-sealing coating has over half the thickness of the porous base and consists of two layers, viz., a Portland cement layer, directly laid on the porous base, and a bituminous mix capable of being compacted by rolling and forming a layer on top the layer of Portland cement.

4. The invention according to claim 1, wherein the water-sealing coating has over half the thickness of the porous base and consists of two layers, viz., a hard tar layer directly laid on the porous base, and a bituminous mix capable of being compacted by rolling and forming a layer on top of the layer of hard tar.

5. The invention according to claim 1, wherein the oil-treated loam has mixed therewith a quantity of fragmentary or finely divided wood waste up to 50% by volume of the loam.

CHARLES D. BOURCIER.